Patented Apr. 20, 1926.

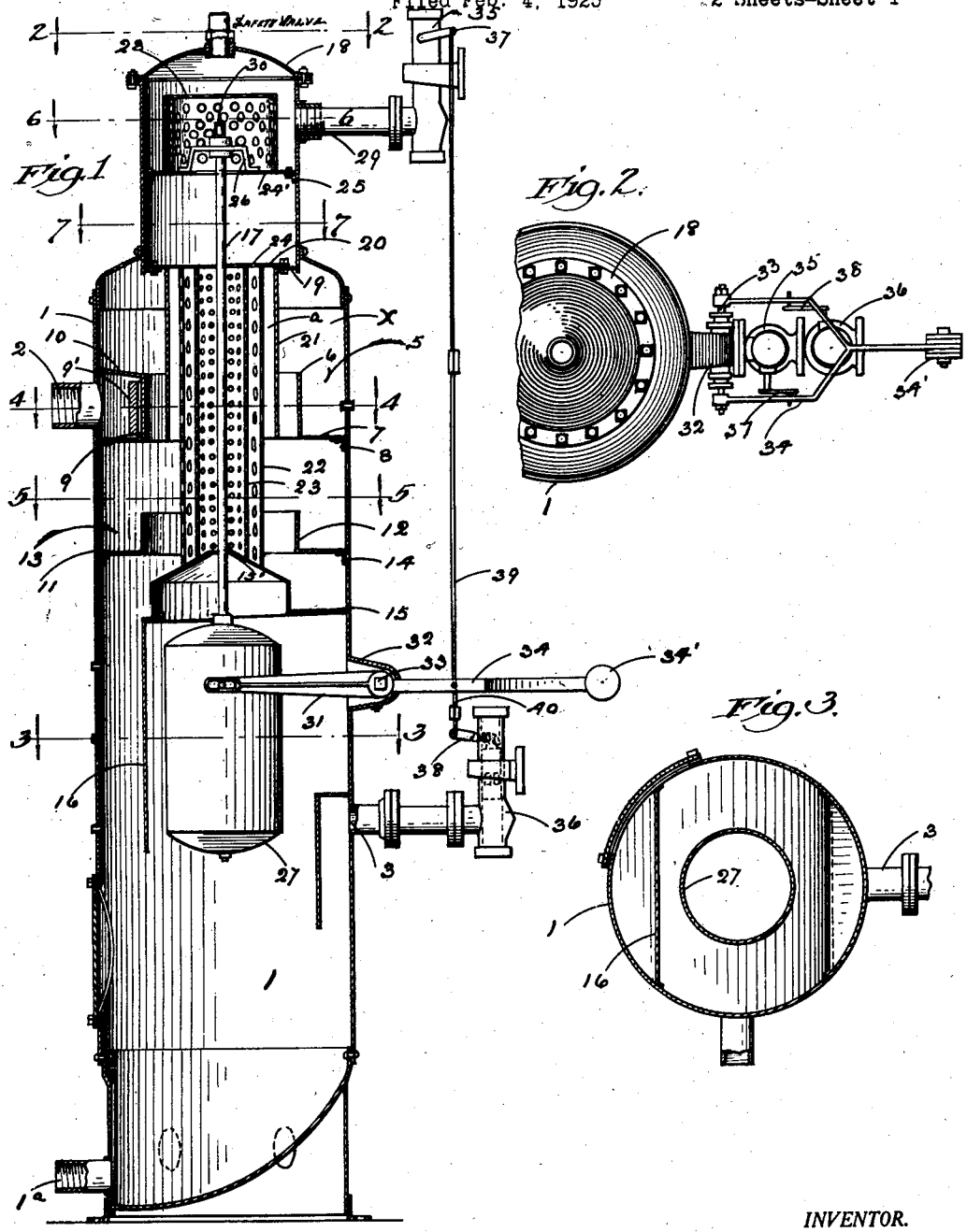
April 20, 1926.  
E. C. WEISGERBER  
GAS AND OIL SEPARATOR  
Filed Feb. 4, 1925   2 Sheets-Sheet 1
1,581,371
INVENTOR.  
EDWIN C. WEISGERBER  
BY  
ATTORNEY.

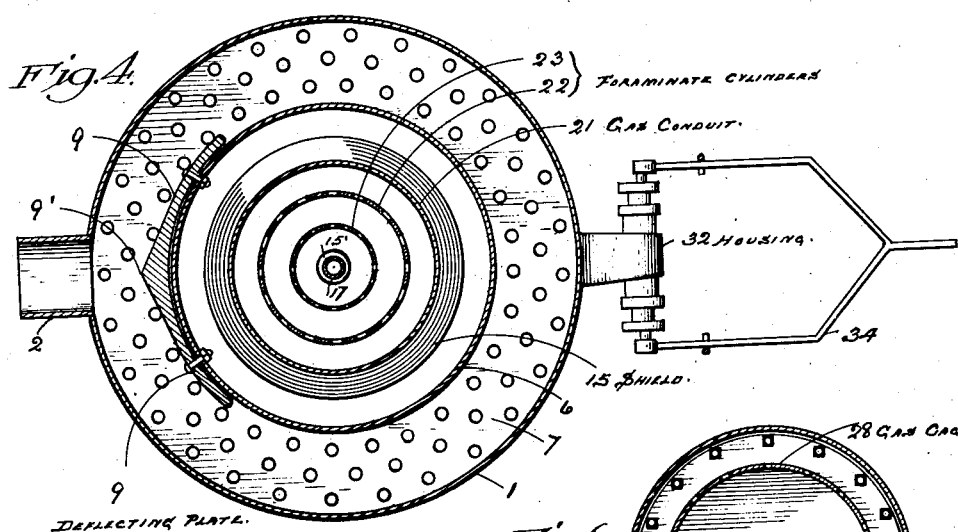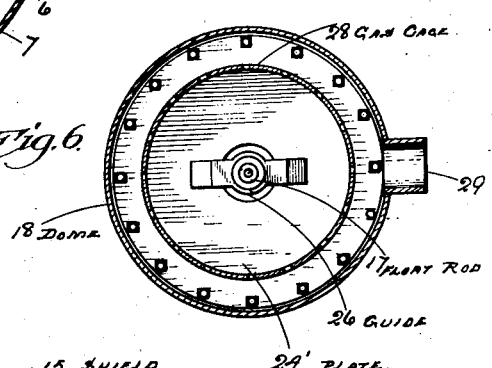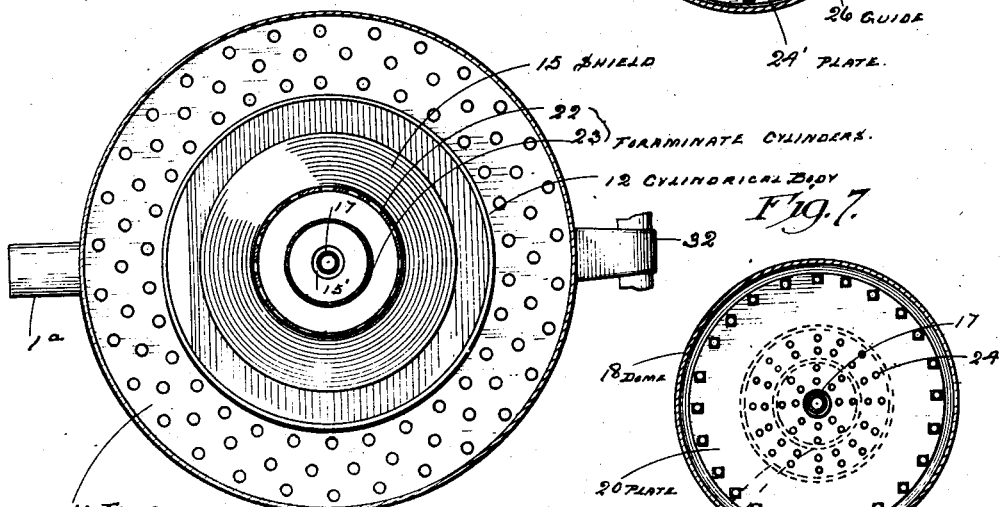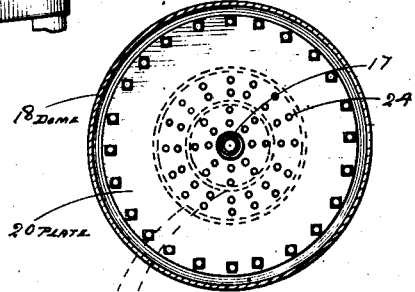

1,581,371

UNITED STATES PATENT OFFICE.

EDWIN C. WEISGERBER, OF LONG BEACH, CALIFORNIA.

GAS AND OIL SEPARATOR.

Application filed February 4, 1925. Serial No. 6,854.

*To all whom it may concern:*

Be it known that I, EDWIN C. WEISGERBER, a citizen of the United States, residing at Long Beach, county of Los Angeles, and State of California, have invented a certain new and useful Gas and Oil Separator, of which the following is a specification.

My invention relates to an apparatus for separating the various constituents of petroleum oil as it comes from the well, and it has particular reference to a device in which the liberation of the gaseous contents from the oil may take place under conditions naturally contributing to a ready release and separation of the combined constituents, and in which the detrital accompaniment or gritty substances may continually gravitate during the inflow and outflow of the oil.

The present invention is of the type disclosed in my Patent Number 1,499,710 of July 1; 1924, and is an improvement over the structure therein disclosed.

The objects of this invention are to provide an apparatus in which the entering oil may be divided in a manner that will facilitate the escape of the contained gas, in which entrained portions of oil are prevented from passing out with the gas, and in which a maximum quantity of gas may be recovered in practically a dry state.

Another object of my invention is to provide a simple device for receiving the contents from an oil well in which the essential parts co-operating to effect the objects mentioned may be readily removed and replaced, and in which valves and valve mechanism may be placed wholly outside the apparatus, whereby inspection, repairs or substitutions may be conveniently made without disturbing the interior of the device.

Other objects will appear from the following specification in connection with the accompanying drawing, which illustrates a preferable embodiment of my invention and in which—

Fig. 1 is a sectional elevation of an apparatus showing my improvement.

Fig. 2 is a plan view showing the float controlled valves.

Fig. 3 is a section on line 3—3— Fig. 1.

Fig. 4 is a sectional plan view taken on line 4—4— Fig. 1.

Fig. 5 is a sectional plan view taken on line 5—5— Fig. 1.

Fig. 6 is a sectional plan view on line 6—6— Fig. 1, showing the guide for the float stem, and.

Fig. 7 is a section on line 7—7— Fig. 6.

The invention comprises the usual arrangement of pressure chamber 1, having an oil inlet 2 near the top and an oil outlet 3 near the bottom thereof for permitting the oil to flow continuously from the chamber after the gaseous content has separated therefrom. In the bottom of the chamber is a drain 1ª for sand, water and other foreign substances delivered to the chamber with the oil. The incoming oil discharges into a channel 5 formed by a concentric cylindrical body 6, having an annular, horizontally disposed floor 7, supported in position within said chamber upon ears 8 or other means. The floor 7 is perforated to permit the oil to gravitate below. Upon the cylindrical body 6 is fastened a deflecting plate 9 having a projecting nose or ledge 9′ which is in direct alinement with the inlet 2 and operates to divide the incoming oil into two streams which travel around the channel 5 in opposite directions. This deflecting plate 9 functions also as a wear plate and for this purpose is made of material that will resist the effects of sand and grit. To prevent splashing of the oil, I may provide a cover 10 on the cylindrical body 6. Below said floor 7, is a similar perforated floor 11, horizontally disposed and supported within the chamber 1 and formed with an upstanding cylindrical body 12 concentric and spaced from the wall of the chamber 1 to provide a channel 13 for receiving the oil from the floor 7 above it. The cylindrical body 12 as seen is diametrically smaller than the body 6 above it to prevent the oil gravitating through the central part thereof, and the floor 11 thereof is supported by ears 14 fastened to the chamber 1. Below the last named floor 11 is an inclined shield 15 for protecting the float, hereinafter referred to, from the inflowing oil and also for creating a quiet zone in the accumulated oil in which the float may operate with constant regularity. The shield 15 for this purpose extends across the chamber and over the float and is provided with a dependent apron 16, which is preferably fastened to the wall of the chamber 1, and which serves to conduct the oil delivered from above to the bottom of the chamber. This shield 15 is provided with a central opening 15', through which gas liberated from the oil in its agitated descent may escape and through which a float rod 17 may extend and operate, as described later. As will appear, the oil is kept, by the arrangement thus far described, in a state of active motion and divided into as many individual streams as possible, in order to effect and facilitate a readier removal of the contained gas. Considerable oil or oil globules are entrained by the gas separating from the oil and in order to arrest these and, in general, whatever wet content there is inherent, I have made the arrangement described presently. The chamber 1 is surmounted by a gas dome 18, which is preferably riveted to the chamber. On the bottom, the dome 18 is provided with an inwardly extended annular flange or lip 19, arranged for supporting a plate 20. From this plate 20 depends a gas conduit 21, which extends through and is diametrically smaller than the cylindrical body 6 and which terminates on a line parallel with the floor 7. Through the space $a$ between the cylindrical body 6 and the conduit 21, the liberated gas which may have collected in the area X between the conduit 21 and the chamber 1, may escape. The conduit 21 embraces or surrounds a means for extracting from the gas whatever globules of oil may be entrained with it and such means may comprise preferably a plurality of foraminate cylinders 22 and 23, the latter within and diametrically smaller than the former, and the perforations in the latter being smaller than those in the cylinder 22. These cylinders 22 and 23 extend beyond the floors 7 and 11 and in contact with the shield 15. They are secured to the plate 20 and depend therefrom, the plate 20, where embraced by the foraminate cylinders 22 and 23, being perforate, as seen at 24, to permit passage of gas to the dome 18.

As seen, the conduit 21, embraces approximately one half the longitudinal extent of the foraminate cylinders 22 and 23, and in addition to forming a gas conduit it serves to prevent any oil rushing into the chamber from striking against foraminate cylinders where the oil rush is exceedingly high and overflows the cylindrical body. This conduit 21 confines the gas rising within the cylinder and causes it to pass through the foraminate cylinders whereby the wet portion entrained by the gas is extracted. It will be noted that the oil passes from one floor to another in its descent to the bottom of the chamber without coming into contact with the foraminate cylinder 22, and hence the gas liberated by attenuating the oil as explained may have unimpeded escape, at the same time undergoing separation of the entrained wet portions. The gas conduit 21 and the cylinders 22 and 23, being connected to the plate 20, are removable therewith, where such removal is necessary.

In the dome 18 is a transverse plate 24', bolted to ears or lugs 25. Upon this plate is secured a guide member 26 for the float rod 17, on the lower end of which is fastened a float 27 operable, as stated, below the shield 15, and for purposes to be explained later. Also upon this plate 24 is a perforated gas cap or cage 28, which serves to arrest any globules of oil that may not have been separated from the gas by the foraminate cylinders 22 and 23. This gas cap or cage 28 is disposed immediately opposite the outlet pipe 29 for the gas.

The outlet pipe 29 for the gas, and the outlet pipe 3 for the oil are controlled by valved means wholly outside said chamber 1 and operated by said float 27, the stem or rod 17 of which is provided with a vent 30 for equalizing the pressure inside the float with the outside gas pressure and preventing collapse or other injury to the float.

To the float 27 is pivotally attached a forked lever 31, which is journaled in a suitable housing 32 on the chamber 1, and onto the journal 33 is fixed a lever 34, carrying an adjustable weight 34' for balancing the float 27.

The gas arranged to escape through outlet pipe 29 is controlled by a valve 35, and the oil arranged to flow continuously through the outlet pipe 3 is controlled by a valve 36, both valves 35 and 36 being synchronously operable by the float 27 for the purpose of proportioning the quantity of escaping gas with the quantity of escaping oil. The valves 35 and 36 are shown herein as of the sliding type, easier operation, no binding and greater simplicity being the factors of advantage attending their use. The valves 35 and 36 are each provided with a cam lever 37 and 38 for operating same, and these cam levers are respectively connected with the float lever 34 by adjustable rods 39 and 40, whereby upon operation of the float 27, the valves are respectively opened and closed.

In normal inoperative position, the float 27, will gravitate as low as the limit of movement of the valves 35 and 36 will permit, the valve 35 obviously being open when the chamber is empty of oil and the valve 36 being closed. When the oil is admitted to the chamber it accumulates in the bottom thereof and the gas accompanying the oil is equally diffused throughout the chamber, being prevented from escaping therefrom by the seated valve 36. The oil gravitates slowly to the bottom of the chamber and being caused to spread over and pass through floors 7 and 11 in attenuated streams, releases the gas which creates a pressure within the chamber and prevents succussion of the fluids. The float 27, rising with the level of the oil, gradually opens the valve 36, permitting the oil to escape through the overflow pipe 3, while the valve 35 relieves the gas pressure within the chamber. When the oil is delivered to the chamber in quantities in excess of the discharge of same from the chamber 1, the float 27, rising with the oil level, will open the valve 36 to its limit, at the same time seating the valve 35. Therefore the accumulating gas pressure will be exerted upon the oil in the chamber and the gravitational discharge of the oil through the overflow pipe will be aided by the gas pressure, such pressure being continued until practically an equilibrium is established. When the inflow of oil is balanced or nearly so, with the overflow, the parts are in substantially the position shown in Fig. 1.

What I claim is:

1. A gas and oil separator comprising a chamber having a gas and oil inlet, and a gas dome upon said chamber, perforate means within said chamber to divide the oil, perforate means to permit the released gas to escape and entrap oil particles carried by the gas, a gas cage in said dome to arrest passage of oil globules, and a gas conduit for preventing the oil contacting with and surrounding the perforate oil entrapping means.

2. A gas and oil separator comprising a chamber having a gas and oil inlet, perforate means horizontally disposed within said chamber to cause the oil to gravitate in a plurality of thin streams, a plurality of vertically disposed foraminate cylinders, one within the other to permit the released gas to escape and entrap the liquid portions carried thereby, and a vertical gas conduit surrounding said cylinders.

3. A gas and oil separator comprising a chamber having a gas and oil inlet, means vertically disposed within said chamber to divide the incoming oil into a plurality of individual streams, perforate horizontal means within said chamber to cause the oil to gravitate therethrough in thin streams, vertically disposed foraminate cylinders within said chamber to permit the released gas to escape and entrap the liquid portions carried thereby, means surrounding said cylinders to convey the gas to the top of the chamber, a gas outlet on said chamber, an oil outlet on said chamber, valvular means wholly outside said chamber to control the flow of gas and oil from said chamber, and float means within said chamber to control said valves.

4. A gas and oil separator comprising a chamber having a gas and oil inlet, perforate means horizontally disposed within said chamber to cause the incoming oil to gravitate in a plurality of individual streams, vertically disposed foraminate means within said chamber to permit the released gas to escape and entrap the liquid portions carried thereby, a gas conduit surrounding the upper part of said foraminate means, a gas outlet near the top of said chamber, an oil outlet near the bottom of said chamber, valvular means outside said chamber to control the flow of gas and oil respectively from the gas and oil outlet, float means within said chamber to operate said valvular means, means to shield said float from the incoming oil, and a gas vent in the top of said chamber.

5. A gas and oil separator comprising a chamber having a gas and oil inlet, a gas outlet in the top of said chamber and an oil outlet near the bottom of said chamber, horizontally disposed perforate plates in said chamber to divide the oil into a plurality of separate streams, one of said plates formed with cylindrical means providing a channel for the inflowing oil, a wear member on said cylindrical means, a gas conduit within and spaced from said cylindrical means, foraminate means embraced within said gas conduit to permit the gas to escape from said chamber and entrap the liquid portions carried thereby, valvular means outside said chamber controlling the gas outlet and oil outlet, and a float for operating said valvular means.

6. A gas and oil separator comprising a chamber having an oil and gas inlet, a valved discharge oil pipe near the bottom thereof, a valved discharge gas pipe in the top thereof, perforate plates within said chamber to divide the oil into a plurality of streams, a wear member on one of said plates, a perforate plate in the upper part of said chamber, a gas conduit suspended from said plate, foraminate cylinders suspended from said plate to permit the gas to escape from said chamber and to entrap oil globules carried by said gas, a float within said chamber, a lever connected to said float, adjustable means connecting said lever with said gas and oil discharge valves and a shield for said float inclined to the horizontal, said shield formed with a dependent apron.

In testimony whereof I have set my hand.

EDWIN C. WEISGERBER.